(12) United States Patent
Nakayama et al.

(10) Patent No.: US 11,691,293 B2
(45) Date of Patent: Jul. 4, 2023

(54) ROBOT

(71) Applicant: FANUC CORPORATION, Yamanashi (JP)

(72) Inventors: Kazutaka Nakayama, Yamanashi (JP); Kenichiro Oguri, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 275 days.

(21) Appl. No.: 16/540,682

(22) Filed: Aug. 14, 2019

(65) Prior Publication Data
US 2020/0070357 A1   Mar. 5, 2020

(30) Foreign Application Priority Data

Aug. 31, 2018 (JP) ................................. 2018-163182
Feb. 28, 2019 (JP) ................................. 2019-035508

(51) Int. Cl.
*B25J 9/16* (2006.01)
*B25J 13/08* (2006.01)

(52) U.S. Cl.
CPC .......... *B25J 13/085* (2013.01); *B25J 9/1641* (2013.01); *B25J 9/1638* (2013.01)

(58) Field of Classification Search
CPC ...... B25J 13/085; B25J 9/1641; B25J 9/1694; B25J 17/0258; B25J 9/1602; B25J 13/08; G05B 2219/37581; G05B 2219/40599
See application file for complete search history.

(56) References Cited

U.S. PATENT DOCUMENTS

| | | | |
|---|---|---|---|
| 2010/0094312 A1 | 4/2010 | Ruiz Morales et al. | |
| 2011/0178639 A1* | 7/2011 | Kwon | B62D 57/032 901/1 |
| 2012/0065781 A1* | 3/2012 | Ikeda | G05B 19/4065 700/261 |

(Continued)

FOREIGN PATENT DOCUMENTS

| | | |
|---|---|---|
| DE | 102016002933 A1 | 8/2016 |
| DE | 102016108077 A1 | 11/2016 |

(Continued)

OTHER PUBLICATIONS

Japanese Notice of Reasons for Refusal dated Feb. 2, 2021, for Japanese Patent Application No. 2019035508.

(Continued)

*Primary Examiner* — Abby Y Lin
*Assistant Examiner* — Dylan M Katz
(74) *Attorney, Agent, or Firm* — Karceski IP Law, PLLC (57) ABSTRACT

A robot including a plurality of joints each configured to rotate about an axis line; a torque sensor S1 configured to detect torque about the axis line of a target joint as one of the plurality of joints; angle information detection units configured to detect information related to a rotation angle of each of the joints about the axis line; a torque change amount estimation unit configured to estimate a change amount of the torque detected by the torque sensor due to a load other than the torque about the axis line of the target joint based on the detected information; and a correction unit configured to correct the torque detected by the torque sensor by using the estimated change amount.

7 Claims, 6 Drawing Sheets

(56) References Cited

U.S. PATENT DOCUMENTS

| | | | |
|---|---|---|---|
| 2012/0316683 A1* | 12/2012 | Seo | B62D 57/032 |
| | | | 901/1 |
| 2013/0012930 A1 | 1/2013 | Ruiz Morales et al. | |
| 2015/0290809 A1 | 10/2015 | Nakagawa et al. | |
| 2015/0367510 A1* | 12/2015 | Naitou | B25J 9/1676 |
| | | | 700/253 |
| 2016/0067865 A1 | 3/2016 | Osada et al. | |
| 2017/0113346 A1 | 4/2017 | Nagata et al. | |
| 2017/0165834 A1 | 6/2017 | Hares | |
| 2018/0021094 A1* | 1/2018 | Matsuda | A61B 90/36 |
| | | | 600/102 |
| 2018/0194013 A1 | 7/2018 | Ruiz Morales et al. | |
| 2019/0275674 A1* | 9/2019 | Yamamoto | B25J 13/00 |
| 2021/0116315 A1* | 4/2021 | Endo | G01L 3/1457 |

FOREIGN PATENT DOCUMENTS

| | | |
|---|---|---|
| DE | 112010004664 B4 | 11/2016 |
| EP | 1915963 A1 | 4/2008 |
| EP | 2491884 A1 | 8/2012 |
| EP | 3162516 A2 | 5/2017 |
| JP | S6274594 A | 4/1987 |
| JP | H04148307 A | 5/1992 |
| JP | 2012254303 A | 12/2012 |
| JP | 2013018075 A | 1/2013 |
| JP | 2015199174 A | 11/2015 |
| JP | 2016057812 A | 4/2016 |
| JP | 2016179168 A | 10/2016 |
| JP | 2017080841 A | 5/2017 |
| WO | 2016152046 A1 | 9/2016 |

OTHER PUBLICATIONS

Japanese Search Report by Registered Search Organization dated Jan. 26, 2021, for Japanese Patent Application No. 2019035508.
German Office Action dated Nov. 23, 2022, for German Patent Application No. 10 2019 122 416.0.

* cited by examiner

ROBOT

CROSS-REFERENCE TO RELATED APPLICATIONS

This application is based on and claims priority to Japanese Patent Application No. 2018-163182, filed on Aug. 31, 2018, and Japanese Patent Application No. 2019-035508, filed on Feb. 28, 2019, the entire contents of both of which are incorporated herein by reference.

FIELD OF THE INVENTION

The present disclosure relates to a robot.

BACKGROUND OF THE INVENTION

A known articulated type robot includes a plurality of joints each provided with a torque sensor configured to detect torque about the axis line of the joint (refer to Japanese Unexamined Patent Application, Publication No. 2017-80841, for example). A robot according to Japanese Unexamined Patent Application, Publication No. 2017-80841 corrects torque about the axis line of one joint by using the torque detected by the torque sensor of another joint positioned on the tip side of the one joint.

This is because the torque about the axis line of the one joint varies due to a load applied in a direction other than the direction about the axis line of the one joint.

SUMMARY OF THE INVENTION

An aspect of the present disclosure provides a robot including: a plurality of joints each configured to rotate about an axis line; a torque sensor configured to detect torque about the axis line of a target joint as one of the plurality of joints; an angle information detection unit configured to detect information related to a rotation angle of each joint about the axis line; a torque change amount estimation unit configured to estimate a change amount of the torque detected by the torque sensor due to a load other than the torque about the axis line of the target joint based on the detected information; and a correction unit configured to correct the torque detected by the torque sensor by using the estimated change amount.

DESCRIPTION OF EMBODIMENT(S) OF THE INVENTION

The following describes a robot 100 according to an embodiment of the present disclosure with reference to the accompanying drawings.

The robot 100 according to the present embodiment is a vertical articulated type robot including six joints rotated about respective axis lines.

Figure 1:
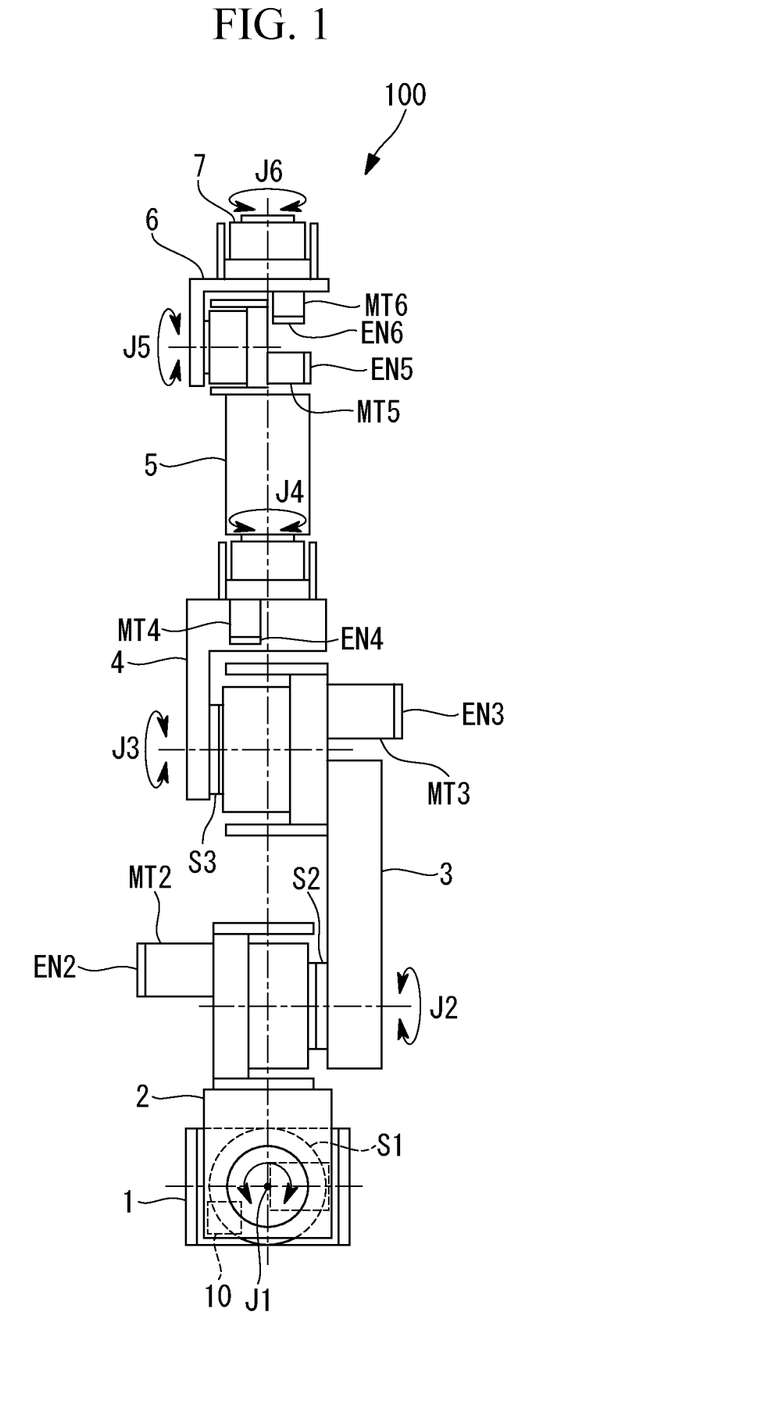
FIG. 1 is a schematic plan view a robot according to an embodiment of the present disclosure.

As illustrated in FIG. 1, the robot 100 includes a base 1 fixed to an installation surface, a rotational barrel (robot constitution component) 2 supported to the base 1 rotatably about a shaft (target joint) J1 extending in the vertical direction, a first arm (robot constitution component) 3 supported to the rotational barrel 2 rotatably about a horizontal shaft (joint) J2 orthogonal to the shaft J1, a second arm (robot constitution component) 4 supported to the first arm 3 rotatably about a shaft (joint) J3 parallel to the shaft J2, a first wrist element (robot constitution component) 5 supported to the second arm 4 rotatably about a shaft (joint) J4 twisted relative to the shaft J3, a second wrist element (robot constitution component) 6 supported to the first wrist element 5 rotatably about a shaft (joint) J5 orthogonal to the shaft J4, and a third wrist element 7 supported to the second wrist element 6 rotatably about a shaft (joint) J6 orthogonal to the shaft J5.

The robot 100 also includes a first torque sensor (torque sensor) S1 disposed between the base 1 and the rotational barrel 2 and configured to detect torque about the shaft J1, a second torque sensor S2 disposed between the rotational barrel 2 and the first arm 3 and configured to detect torque about the shaft J2, and a third torque sensor S3 disposed between the first arm 3 and the second arm 4 and configured to detect torque about the shaft J3.

Figure 2:
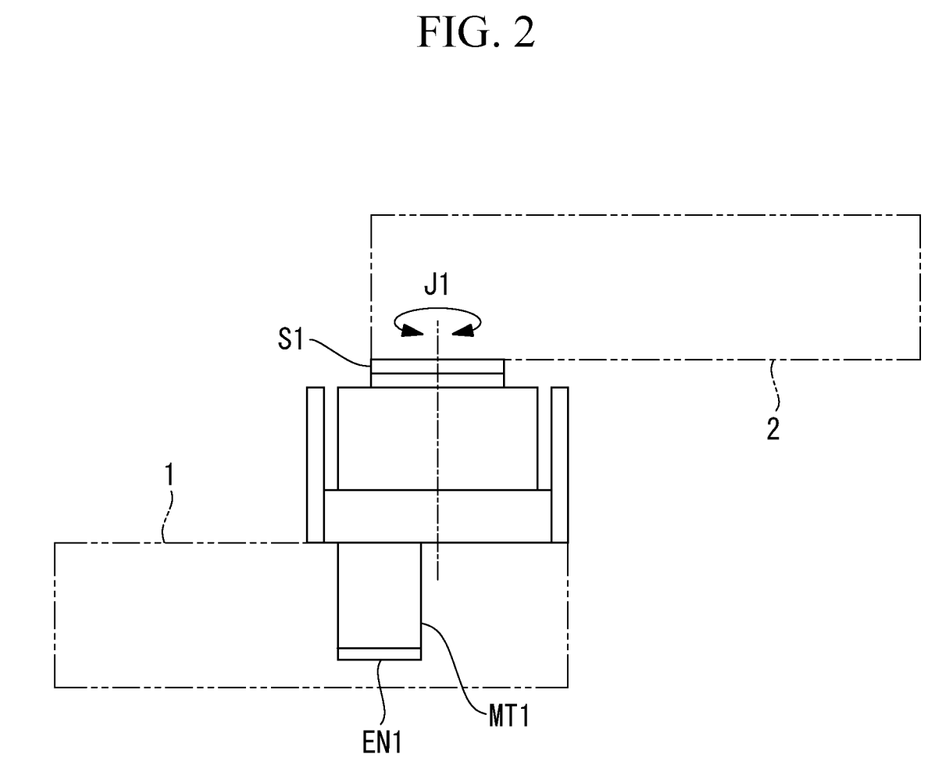
FIG. 2 is a schematic side view of a part at which a base and a rotational barrel are connected with each other in the robot in FIG. 1.

The robot 100 also includes motors MT1 to MT6 configured to drive the components about the shafts J1 to J6, encoders (angle information detection units) EN1 to EN6 included in the motors MT and configured to detect rotation angles about the shafts J1 to J6, and a control unit 10 configured to control the drive of the components about the shafts J1 to J6 by using the detected rotation angles about the shafts. The motor MT1, which drives the rotational barrel 2 about the shaft J1 relative to the base 1, and the encoder EN1 are illustrated in FIG. 2 but not in FIG. 1.

The control unit 10 illustrated in FIG. 1 includes a CPU, a ROM, and a RAM (not illustrated). The control unit 10 executes the function of a computer program stored in the ROM as the CPU loads the computer program onto the RAM.

Figure 3:
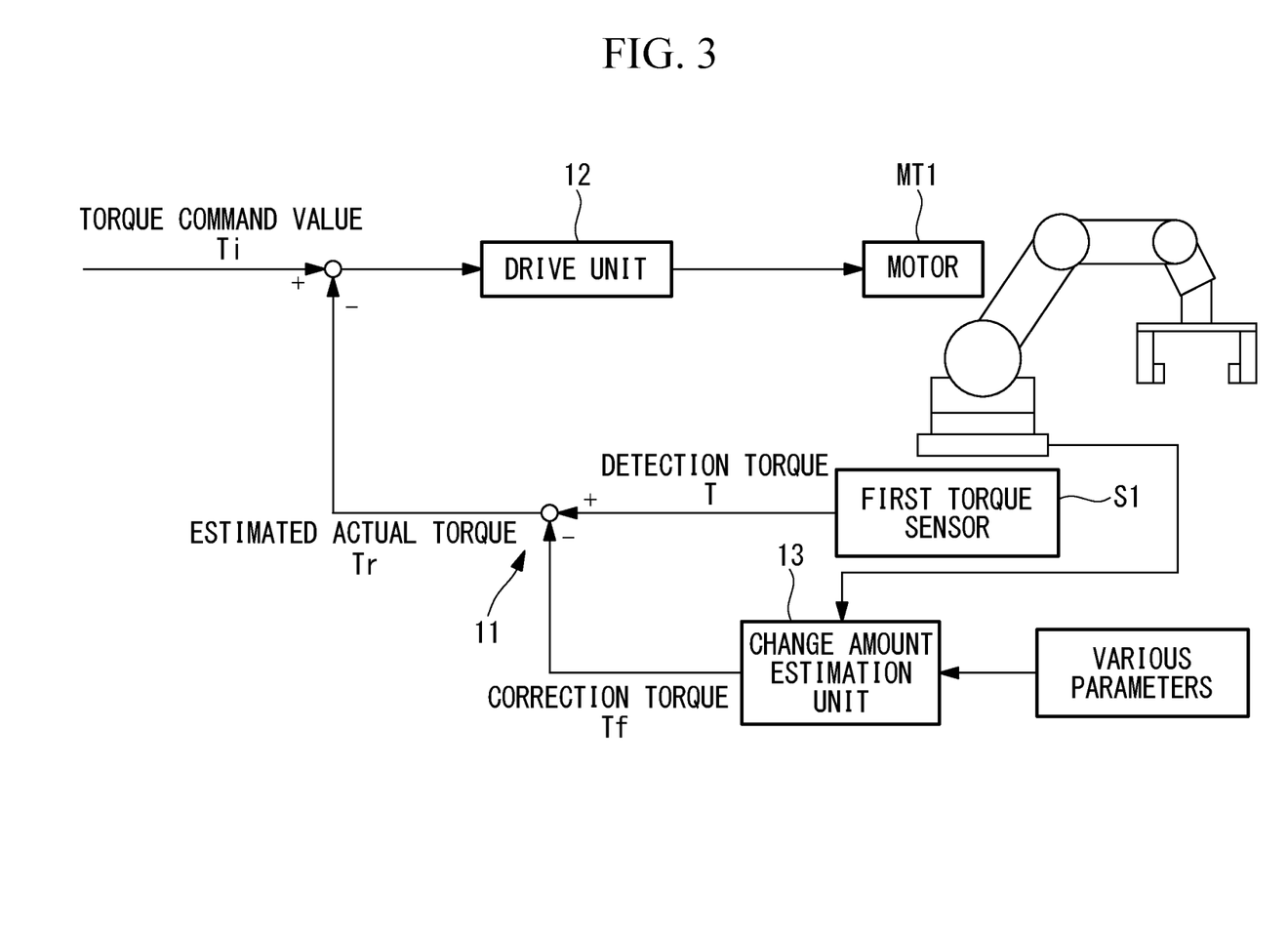
FIG. 3 is a block diagram of torque control of a motor by a control unit of the robot in FIG. 1.

As illustrated in FIG. 3, the control unit 10 includes a change amount estimation unit (torque change amount estimation unit) 13 configured to calculate correction torque (change amount) Tf by estimating a change amount of torque detected by the first torque sensor S1 in accordance with a posture change of the robot 100, a correction unit 11 configured to correct detection torque T by using the correction torque Tf calculated by the change amount estimation unit 13, and a drive unit 12 configured to drive the motor MT1 based on a torque command value Ti input to drive the motor MT1, the detection torque T, and the correction torque Tf.

The change amount estimation unit 13 calculates and stores in advance (for example, at shipment), a rotation angle characteristic in the format of a table or approximate expression of the detection torque T detected by the torque sensor for the rotation angle when each joint is rotated about the shaft.

Figure 4:
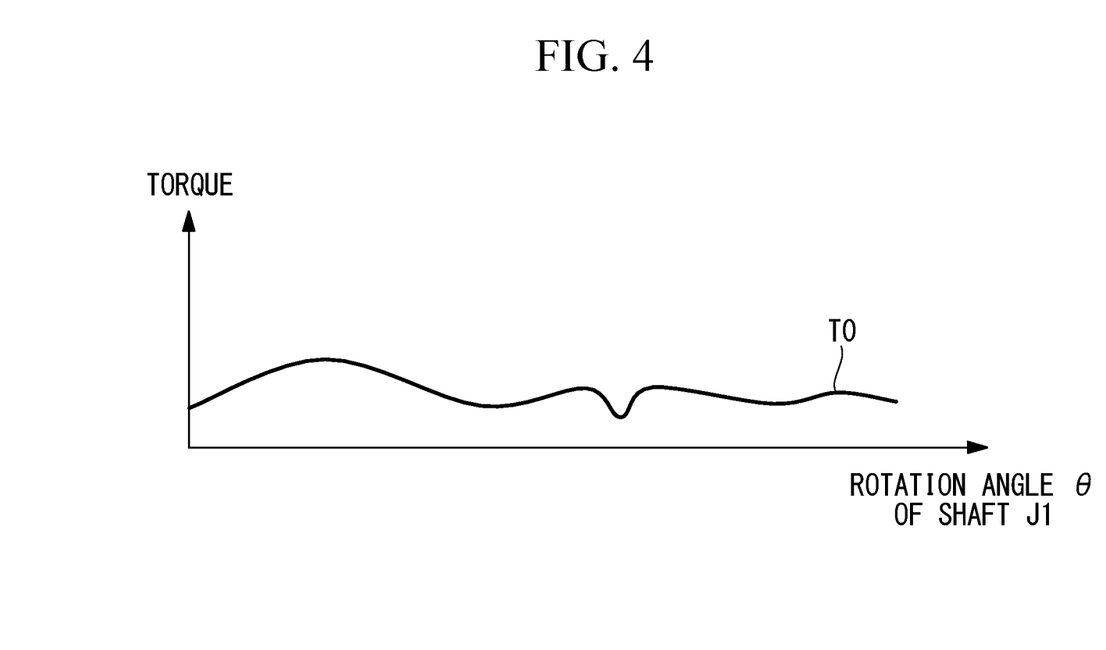
FIG. 4 is a graph illustrating exemplary change of detection torque with the rotation angle of the rotational barrel about a shaft J1.

For example, FIG. 4 illustrates torque T0 detected by the first torque sensor S1 when only the rotation angle about the shaft J1 is changed and the other joints are fixed at such rotation angles that no load is applied on the shaft J1.

Exemplary postures of the robot 100 in which no load is applied on the shaft J1 include a posture of the robot 100 in which the shafts J4 and J6 are aligned with an extended line of the shaft J1 in effect, and a posture of the robot 100 in which the rotational barrel 2 and mechanisms on the tip side thereof are removed.

Figure 6:
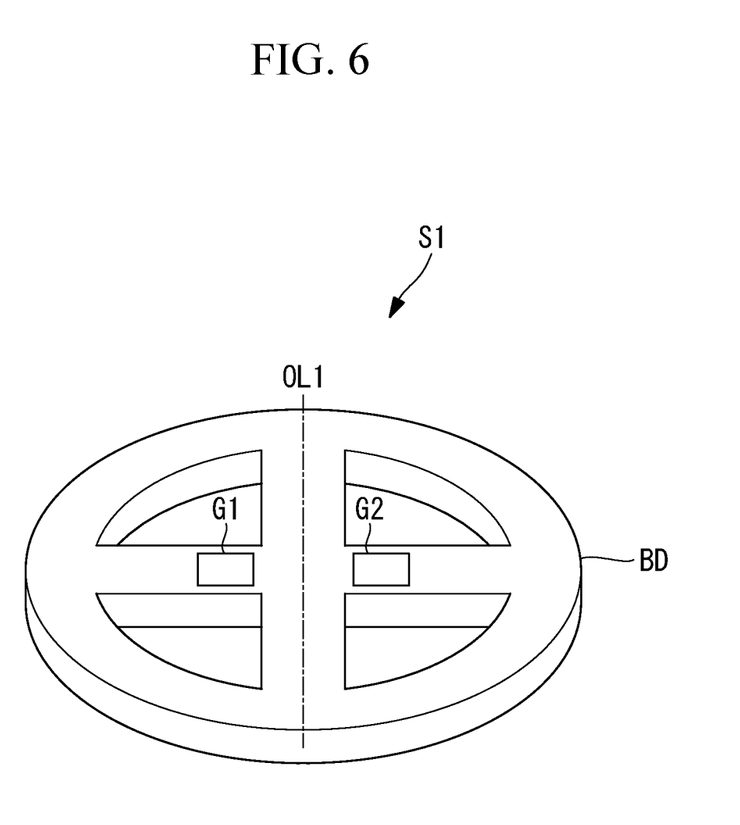
FIG. 6 is a perspective view illustrating an exemplary first torque sensor included in the robot in FIG. 1.

When the rotational barrel 2 rotates about the shaft J1 while the posture of the robot 100 in which no load is applied about the shaft J1 is maintained, the torque about the shaft J1 detected by the first torque sensor S1 is ideally zero. However, in reality, two distortion gauges G1 and G2 are bonded to the surface of a body BD of the first torque sensor S1 as illustrated in FIG. 6, and the detection torque T is determined based on a distortion amount detected by G1 and G2. Error occurs to the detection torque T due to, for example, shift of the bonding positions of the distortion gauges G1 and G2 in some cases.

According to FIG. 4, the torque T0 changes in accordance with the rotation angle about the shaft J1 detected by the first encoder EN1.

Figure 5:
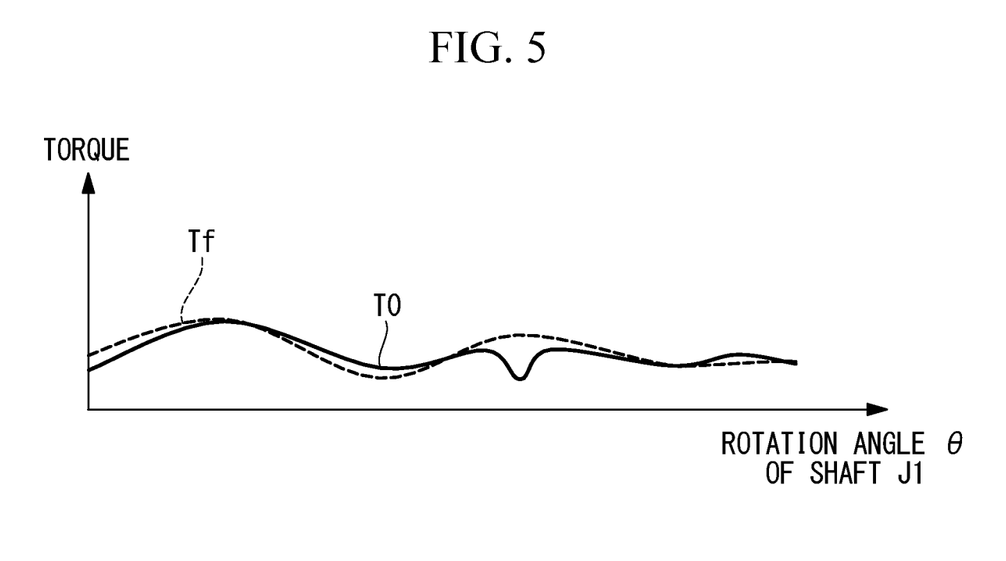
FIG. 5 is a graph illustrating exemplary correction torque calculated based on the detection torque illustrated in FIG. 4.

The rotation angle characteristic of the torque T0 detected by the first torque sensor S1 as illustrated in FIG. 5 is stored in the change amount estimation unit 13 in the format of a table or approximate expression. In addition, the rotation angle characteristics of torque for the rotation angles of all joints are stored in the change amount estimation unit 13 in the format of a table or an approximate expression. The table or the approximate expression is calculated by plotting data of the correlation between the rotation angle and torque by experiment. Coefficients of the table or the approximate expression are calculated from the plotted data.

The rotation angle characteristics of torque may be not only measured by actually operating the robot but also measured by simulation.

Accordingly, at actual operation of the robot, the change amount estimation unit can calculate the correction torque Tf by matching the rotation angles of the shafts detected by the encoders to the stored rotation angle characteristics or by performing interpolation.

Then, the correction unit 11 calculates estimated actual torque Tr by subtracting the correction torque Tf estimated by the change amount estimation unit 13 from the detection torque T of the first torque sensor S1 in the robot 100 in use as indicated in Expression (1) below.

$$\text{Estimated actual torque } Tr = \text{Detection torque } T - \text{Correction torque } Tf \quad (1)$$

The estimated actual torque Tr indicates actual torque applied to the shaft J1 about the shaft J1, from which any load other than the torque about the shaft J1 is removed. The correction unit 11 may calculate the estimated actual torque Tr not only by subtracting the correction torque Tf from the detection torque T but also by using any calculation method of addition, multiplication, or division.

The drive unit 12 drives the motor MT1 at a drive torque obtained by subtracting the estimated actual torque Tr from input torque Ti based on an input command for controlling the robot 100. The detection torque T detected by the first torque sensor S1 while the motor MT1 is driven, from which the correction torque Tf is then subtracted as illustrated in FIG. 3, is used as the estimated actual torque Tr in feedback control of the drive unit 12.

The following describes effects of the robot 100 according to the present embodiment configured in this manner.

The detection torque T detected by the first torque sensor S1 includes torque caused by a load other than the torque about the shaft J1 in some cases. In the present embodiment, the change amount estimation unit 13 estimates the correction torque Tf as a change amount based on the rotation angle of each joint of the robot 100 and the stored rotation angle characteristics as illustrated in FIG. 3. Then, the correction unit 11 corrects the detection torque T of the first torque sensor S1 by using the correction torque Tf to obtain the estimated actual torque Tr as the detection torque T of the first torque sensor S1 from which a load other than the torque about the shaft J1 is removed. Accordingly, the torque about the shaft J1 is accurately acquired as the estimated actual torque Tr, and thus the robot 100 can be accurately controlled.

In addition, in the robot 100 according to the above-described embodiment, when lead-through teaching in which an operator directly contacts an arm and adds external force to the arm is performed, torque generated about the shaft J1 by the external force can be accurately estimated by using the estimated actual torque Tr. Accordingly, the robot 100 can be prevented from wrongly operating in feedback control of the drive unit 12 by using the detection torque T of the first torque sensor S1.

In addition, according to the present embodiment, the correction unit 11 does not need a value detected by a torque sensor other than the first torque sensor S1 in calculation of the correction torque Tf for correcting the detection torque T about the shaft J1. Thus, not all joints of the robot 100 need to be provided with torque sensors, which leads to cost reduction of the robot 100.

In addition, in the present embodiment, encoders are exemplarily described as angle information detection units, and the rotation angles about the shafts J1 to J6 are exemplarily described as information related to angles, but the present invention is not limited thereto. Angle speed or angle acceleration may be detected. The angle speeds and/or angle accelerations about the shafts J1 to J6 may be used in addition to the rotation angles about the shafts J1 to J6 when the correction torque Tf is calculated. Alternatively, information related to the angles of some joints, not all joints, may be used when the correction torque Tf is calculated.

The change amount estimation unit 13 may store physical parameters (for example, sizes and weights) of the robot constitution components (such as the first arm 3 and the like) coupling the shafts J1 to J6, and estimate the correction torque Tf based on the physical parameters and the rotation angles. In this case, the change amount estimation unit 13 can more accurately calculate the correction torque Tf by using inertia moment caused by an arm weight or the like and applied in a direction other than the direction about the shaft J1, and tensile force or compressive force applied in the direction along the shaft J1.

In the above-described embodiment, the correction unit 11 corrects the detection torque T of the first torque sensor S1, but similarly to the detection torque T of the first torque sensor S1, torque detected by the second torque sensor S2 and torque detected by the third torque sensor S3 may be each corrected by using the correction torque of the corresponding shaft. The robot 100 may include a torque sensor configured to detect torque about the axis line of a joint (for example, the shaft J4) different from that in the above-described embodiment.

In the present embodiment, the correction unit 11 and the change amount estimation unit 13 may be each provided to an optional component on the arms 3 and 4 of the robot 100 or provided inside a robot controller configured to control the robot 100. Alternatively, the correction unit 11 and the change amount estimation unit 13 may be each provided inside a peripheral device other than the arms 3 and 4 of the robot 100 and the robot controller, or installed as a separately provided control unit and connected with the robot controller. The correction unit 11 and the change amount estimation unit 13 may be provided at places different from each other.

The above-described embodiment is derived from each aspect of the present disclosure described below.

An aspect of the present disclosure provides a robot including: a plurality of joints each configured to rotate about an axis line; a torque sensor configured to detect torque about the axis line of a target joint as one of the plurality of joints; an angle information detection unit configured to detect information related to a rotation angle of each joint about the axis line; a torque change amount estimation unit configured to estimate a change amount of the torque detected by the torque sensor due to a load other than the torque about the axis line of the target joint based on the detected information; and a correction unit configured to correct the torque detected by the torque sensor by using the estimated change amount.

When the target joint is rotated about the axis line or external force is applied about the axis line of the target joint, torque about the axis line is detected by the torque sensor. When the posture of the robot is changed as each joint rotates about the axis line, torque on which a load other than the torque about the axis line of the target joint is superimposed is detected by the torque sensor in some cases.

According to the present aspect, as each joint rotates about the axis line, the angle information detection unit detects information related to the rotation angle of the joint about the axis line, and the torque change amount estimation unit estimates the change amount of torque due to a load other than torque about the axis line of the target joint based on the detected information. Then, the torque detected by the torque sensor is corrected by using the estimated change amount to remove the load other than the torque about the axis line of the target joint. Accordingly, the torque about the axis line of the target joint can be accurately acquired without providing a torque sensor to a joint other than the target joint, and the robot can be accurately controlled.

In the above-described aspect, the information may be the rotation angle of each joint about the axis line.

With this configuration, the rotation angle of each joint is detected by the angle information detection unit, and torque can be corrected using the change amount of a load estimated in accordance with change in the posture of the robot.

In the above-described aspect, the information may be an angle speed or angle acceleration of each joint about the axis line.

With this configuration, the angle speed or angle acceleration of each joint is detected by the angle information detection unit, and the change amount of a load is estimated in accordance with the detected angle speed or angle acceleration.

The above-described aspect may further include a robot constitution component configured to couple the joints, and the information may be information of a load on each joint, which is calculated from a rotation angle, angle speed, or angle acceleration of each joint about the axis line, and a physical parameter of the robot constitution component.

With this configuration, the angle information detection unit calculates, as information related to the rotation angle, load information such as inertia moment, tensile force, or compressive force based on the detected rotation angle, angle speed, or angle acceleration and the physical parameter of the robot constitution component. A load other than torque applied to the target joint about the axis line is calculated based on the calculated load information, and accordingly, torque about the axis line of the target joint can be accurately acquired.

In the above-described aspect, the load other than the torque about the axis line of the target joint may be torque about an orthogonal axis line disposed in a plane orthogonal to the axis line of the target joint.

In the above-described aspect, the load other than the torque about the axis line of the target joint may be a tensile or compressive load acting in a direction along the axis line of the target joint.

In the above-described aspect, the correction unit may correct the torque detected by the torque sensor based on a torque characteristic indicating a relation between the torque detected by the torque sensor and the information of the target joint detected by the angle information detection unit when the target joint is rotated about the axis line of the target joint while no load other than the torque about the axis line of the target joint is applied.

The torque characteristic indicates a torque change amount in response to change in a value detected by the angle information detection unit while the torque about the axis line of the target joint is not applied to the target joint. In other words, the torque characteristic indicates a characteristic attributable to a detection error of the torque sensor, and thus the torque about the axis line of the target joint can be more accurately acquired by correcting a detection torque by using the torque characteristic.

The invention claimed is:

1. A robot, comprising:
    a plurality of joints, each joint being configured to rotate about an axis line, a robot constitution component extending between at least two joints;
    a torque sensor configured to detect a torque about the axis line of a target joint, the torque including a torque acting around the axis line of the target joint by inertia force of the robot constitution component, which occurs due to a movement of the robot, and a weight of the robot constitution component;
    an encoder configured to detect information related to a rotation angle about the axis line of all or part of the plurality of joints, the part of the plurality of joints including the target joint and at least one joint other than the target joint; and
    a processor comprising hardware, the processor being configured to:
    estimate a change amount of the torque detected by the torque sensor due to a load other than the torque about the axis line of the target joint based on the detected information of all or part of the plurality of joints, the load including a load acting on the target joint by the inertia force and the weight of the robot constitution component; and
    correct the torque detected by the torque sensor by using the estimated change amount to calculate the torque about the axis line of the target joint to drive the target joint based on the calculated torque and a motor torque command value.

2. The robot according to claim 1, wherein the detected information is a rotation angle of each joint about the axis line.

3. The robot according to claim 1, wherein the detected information is at least one of an angle speed or angle acceleration of each joint about the axis line.

4. The robot according to claim 1, further comprising a robot constitution component extending between at least two joints from the plurality of joints, wherein the detected information is a load on each joint, wherein the load is calculated from at least one of a rotation angle, angle speed, or angle acceleration of each joint about the axis line, and a physical parameter of the robot constitution component.

5. The robot according to claim 1, wherein the load other than the torque about the axis line of the target joint is a torque about an orthogonal axis line disposed in a plane orthogonal to the axis line of the target joint.

6. The robot according to claim 1, wherein the load other than the torque about the axis line of the target joint is at least one of a tensile or compressive load acting in a direction along the axis line of the target joint.

7. The robot according to claim 1, wherein the corrector corrects processor is configured to correct the torque detected by the torque sensor based on a relation between the torque detected by the torque sensor and the information of the target joint detected by the encoder when the target joint is rotated about the axis line of the target joint, the relation being stored in memory in advance.

\* \* \* \* \*